(12) United States Patent
Qin et al.

(10) Patent No.: US 12,288,502 B2
(45) Date of Patent: Apr. 29, 2025

(54) METHOD, APPARATUS AND ELECTRONIC DEVICE FOR DEBUGGING DRIVING PARAMETERS OF A DISPLAY PANEL

(71) Applicant: Wuhan Tianma Microelectronics Co., Ltd., Wuhan (CN)

(72) Inventors: Shiyu Qin, Wuhan (CN); Jilong Jiang, Wuhan (CN)

(73) Assignee: WUHAN TIANMA MICROELECTRONICS CO., LTD., Wuhan (CN)

(*) Notice: Subject to any disclaimer, the term of this patent is extended or adjusted under 35 U.S.C. 154(b) by 0 days.

(21) Appl. No.: 18/212,206

(22) Filed: Jun. 21, 2023

(65) Prior Publication Data

US 2024/0282236 A1    Aug. 22, 2024

(30) Foreign Application Priority Data

Feb. 16, 2023   (CN) .......................... 202310131768.1

(51) Int. Cl.
*G09G 3/00* (2006.01)
*G09G 3/20* (2006.01)
(Continued)

(52) U.S. Cl.
CPC .......... *G09G 3/2092* (2013.01); *G09G 3/006* (2013.01); *G09G 3/3225* (2013.01); *G09G 3/3208* (2013.01); *G09G 2320/0233* (2013.01); *G09G 2320/0242* (2013.01); *G09G 2320/0285* (2013.01); *G09G 2320/0673* (2013.01);
(Continued)

(58) Field of Classification Search
CPC ... G09G 2320/0233; G09G 2320/0285; G09G 2360/16; G09G 2320/0626; G09G 2320/0693; G09G 2320/0276; G09G 2320/0666; G09G 2320/0673;
(Continued)

(56) References Cited

U.S. PATENT DOCUMENTS 10,460,655 B2 * 10/2019 Zhang ...................... H04N 9/69
11,645,963 B2 *  5/2023 Seo ........................ G09G 3/2003
                                                            345/204
(Continued)

FOREIGN PATENT DOCUMENTS

CN    111524484 A    8/2020
CN    112863427 B    5/2022

*Primary Examiner* — Dismery Mercedes
(74) *Attorney, Agent, or Firm* — East IP P.C.

(57) ABSTRACT

The embodiments of the present application provide a method, an apparatus and an electronic device for debugging driving parameters of a display panel, and relate to the field of display technology. The method for debugging driving parameters of a display panel includes: obtaining position information of the display panel to be debugged on a motherboard to which the display panel to be debugged belongs; determining first target driving parameter information of the display panel to be debugged according to the position information; and debugging the driving parameters of the display panel to be debugged according to the first target driving parameter information. The embodiments of the present application are beneficial to shorten the debugging duration of the driving parameters of the display panel and improve the debugging efficiency of the driving parameters.

18 Claims, 12 Drawing Sheets

(51) Int. Cl.
*G09G 3/3225* (2016.01)
*G09G 3/3208* (2016.01)

(52) U.S. Cl.
CPC . *G09G 2320/0693* (2013.01); *G09G 2320/08* (2013.01); *G09G 2330/02* (2013.01); *G09G 2330/08* (2013.01); *G09G 2360/16* (2013.01)

(58) Field of Classification Search
CPC .......... G09G 3/006; G09G 2320/0242; G09G 2310/08; G09G 2330/10; G09G 2330/02
See application file for complete search history.

(56) References Cited

U.S. PATENT DOCUMENTS

| | | | |
|---|---|---|---|
| 11,688,340 B2* | 6/2023 | Zhu | G09G 3/006 |
| | | | 345/694 |
| 2005/0134526 A1* | 6/2005 | Willem | G06F 3/147 |
| | | | 345/1.3 |
| 2009/0193396 A1* | 7/2009 | Hartadinata | G06F 11/3656 |
| | | | 717/125 |
| 2010/0128053 A1* | 5/2010 | Kato | G09G 5/06 |
| | | | 345/589 |
| 2015/0228242 A1* | 8/2015 | Kim | G09G 3/3696 |
| | | | 345/206 |
| 2015/0370112 A1* | 12/2015 | Sawabe | G06F 3/1446 |
| | | | 349/73 |
| 2021/0150968 A1* | 5/2021 | Chen | G09G 3/3406 |
| 2021/0264838 A1* | 8/2021 | Park | G09G 3/3648 |
| 2022/0301470 A1* | 9/2022 | Cao | G09G 3/006 |
| 2022/0301482 A1* | 9/2022 | Wang | G09G 3/006 |
| 2022/0327981 A1* | 10/2022 | Seo | G09G 3/006 |
| 2023/0058388 A1* | 2/2023 | Zhu | G09G 3/2074 |

* cited by examiner under a condition that the determination result is the target database exists, under a condition that the version information of the target database is the latest version information, determining the initial driving parameter information in the target database matched with the location information as the first target driving parameter information of the display panel to be debugged ── S11

Fig. 8 under a condition that the determination result is the target database exists, under a condition that the version information of the target database is not the latest version information, obtaining an updated target database by updating missing initial driving parameter information in the target database to the target initial driving parameter information, wherein the updated target database is the target database corresponding to the latest version information, and the target initial driving parameter information is the initial driving parameter information stored in a fixture ── S12 determining the initial driving parameter information in the updated target database matched with the location information as the first target driving parameter information of the display panel to be debugged ── S13

Fig. 9

METHOD, APPARATUS AND ELECTRONIC DEVICE FOR DEBUGGING DRIVING PARAMETERS OF A DISPLAY PANEL

CROSS-REFERENCE TO RELATED APPLICATION

This application claims priority to Chinese Patent Application No. 202310131768.1, filed on Feb. 16, 2023, which is incorporated herein by reference in its entirety.

TECHNICAL FIELD

The present application relates to the field of display technology, and particularly to a method, an apparatus and an electronic device for debugging driving parameters of a display panel.

BACKGROUND

Driving parameters of a display panel that affect the display effect of the display panel, such as Gamma data, may be debugged, and the debugged driving parameters may be burned to a Driver IC to light up the display panel and stabilize the display effect of the display panel. The display panel in related technologies has the problems of long debugging duration of driving parameters and low debugging efficiency of driving parameters.

SUMMARY

The embodiments of the present application provide a method, an apparatus and an electronic device for debugging driving parameters of a display panel.

In a first aspect, the embodiments of the present application provide a method for debugging driving parameters of a display panel, including: obtaining position information of the display panel to be debugged on a motherboard to which the display panel to be debugged belongs; determining first target driving parameter information of the display panel to be debugged according to the position information; and debugging the driving parameters of the display panel to be debugged according to the first target driving parameter information.

Based on a same invention concept, in a second aspect, the embodiments of the present application provide an apparatus for debugging driving parameters of a display panel, including: an obtaining module for obtaining position information of the display panel to be debugged on a motherboard to which the display panel to be debugged belongs; a first determination module for determining first target driving parameter information of the display panel to be debugged according to the position information; and a debugging module for debugging the driving parameters of the display panel to be debugged according to the first target driving parameter information.

Based on the same invention concept, in a third aspect, the embodiments of the present application provide an electronic device including a processor and a memory for storing computer program instructions, which when executed by the processor, implement the method for debugging driving parameters of a display panel as described in the embodiments of the first aspect.

Based on the same invention concept, in a fourth aspect, the embodiments of the present application provides a computer-readable storage medium having computer program instructions stored thereon, the computer program instructions when executed by a processor implement the method for debugging driving parameters of a display panel as described in the embodiments of the first aspect.

Based on the same invention concept, in a fifth aspect, the embodiments of the present application provides a computer program product comprising computer program, the computer program when executed by a processor implement the method for debugging driving parameters of a display panel as described in the embodiments of the first aspect.

BRIEF DESCRIPTION OF THE DRAWINGS

Other features, purposes and advantages of the present application will be more apparent by reading the following detailed description of the non-restrictive embodiments made with reference to the drawings, where the same or similar references indicate the same or similar features and the drawings are not drawn in actual proportions.

FIG. 8 shows yet another schematic flow diagram of the method for debugging driving parameters of the display panel provided according to the embodiments of the present application;

FIG. 9 shows yet another schematic flow diagram of the method for debugging driving parameters of the display panel provided according to the embodiments of the present application;

DETAILED DESCRIPTION

Figure 1:
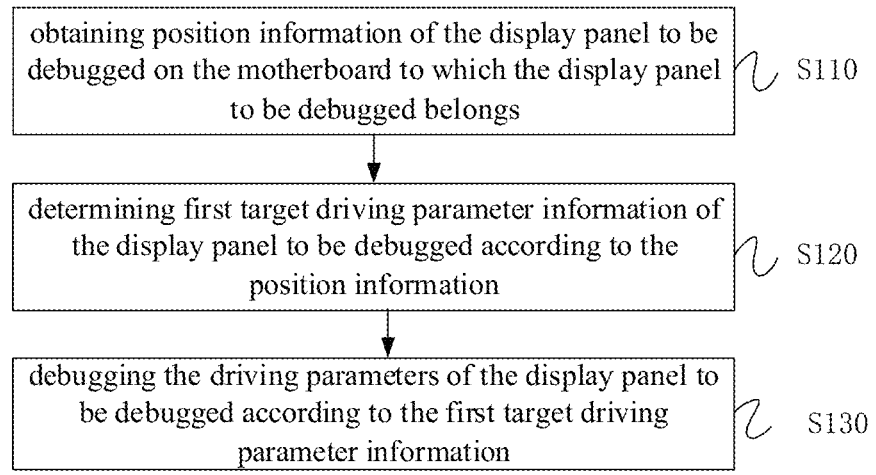
FIG. 1 shows a schematic flow diagram of a method for debugging driving parameters of a display panel provided according to the embodiments of the present application.

Features and exemplary embodiments of various aspects of the present application will be described in detail below. In order to make the objectives, technical solutions, and advantages of the present application clearer, the present application will be further described in detail below with reference to the drawings and specific embodiments. It should be understood that the specific embodiments described herein are merely intended to explain the present application, rather than to limit the present application. For those skilled in the art, the present application can be implemented without some of these specific details. The following description of the embodiments is merely to provide a better understanding of the present application by illustrating the examples of the present application.

It should be noted that, in the present application, relational terms, such as first and second, are used merely to distinguish one entity or operation from another entity or operation, without necessarily requiring or implying any actual such relationships or orders for these entities or operations. Moreover, the terms "comprise", "include", or any other variants thereof, are intended to represent a non-exclusive inclusion, such that a process, method, article or device including a series of elements includes not only those elements, but also other elements that are not explicitly listed or elements inherent to such a process, method, article or device. Without more constraints, the elements following an expression "comprise/include . . . " do not exclude the existence of additional identical elements in the process, method, article or device that includes the elements.

It should be understood that the term "and/or" used herein merely represents an association relationship for describing the associated entities, indicating that there may be three kinds of relationships, for example, A and/or B may indicate A alone, both A and B, and B alone. In addition, the character "/" uses herein generally indicates that the associated entities before and after it are in an "or" relationship.

It will be apparent to those skilled in the art that various modifications and variations can be made to the present application without departing from the gist or scope of the present application. Accordingly, the present application is intended to encompass the modifications and variations to the present application that fall within the scope of the appended claims (the claimed technical solutions) and equivalents thereof. It should be noted that the implementations provided by the embodiments of the present application can be combined with one another if there is no conflict.

Before the technical solutions provided by the embodiments of the present application are described, the problems in the art are first described in the present application to facilitate the understanding of the embodiments of the present application.

Through the research of the inventors, it is found that the current manufacturing processes in semiconductor manufacturing and other industries include wafer or glass etching and ion implantation. In the above processes, there are some differences in the device characteristics on the motherboard because of the process problems. As an example, the same batch of Organic Light-Emitting Diode (OLED) motherboards can be divided into group A and group B for cutting. Each of group A motherboard and group B motherboard may include 19 rows and 5 columns, that is, each of the group A motherboard and the group B motherboard may include 19×5=95 display panels to be debugged. Group A motherboard and group B motherboard can be divided into 36 areas according to experience. As shown in Table 1 below, Table 1 shows subthreshold swing (SS) test data of each area in Group A motherboard and each area in Group B motherboard after the completion of fabrication.

TABLE 1

| COLUMN | B | | | A | | |
|---|---|---|---|---|---|---|
| | 1 | 2, 3 | 4, 5 | 1 | 2, 3 | 4, 5 |
| 1, 2, 3 | 0.51 | 0.51 | 0.54 | 0.58 | 0.58 | 0.53 |
| 4, 5, 6, 7 | 0.53 | 0.56 | 0.58 | 0.62 | 0.57 | 0.53 |
| 8, 9, 10 | 0.57 | 0.59 | 0.63 | 0.65 | 0.62 | 0.57 |
| 11, 12, 13 | 0.56 | 0.58 | 0.63 | 0.63 | 0.62 | 0.56 |
| 14, 15, 16 | 0.53 | 0.57 | 0.63 | 0.61 | 0.55 | 0.50 |
| 17, 18, 19 | 0.50 | 0.56 | 0.63 | 0.59 | 0.57 | 0.52 |

In Table 1, 1-19 represents the number of rows in the motherboard, i. e., 1-19 represent rows 1-19 in the group A motherboard or rows 1-19 in the group B motherboard, respectively. A represents the group A motherboard, 1-5 below A represents columns 1-5 in the group A motherboard. B represents the B group motherboard, and 1-5 below B represents columns 1-5 in the B group motherboard. The subthreshold swing test data in Table 1 may be the subthreshold swing test data corresponding to the center point of the corresponding area. As an example, 0.65 may represent the subthreshold swing test data corresponding to the center point of column 1, rows 8 to 10 in the group A motherboard.

As shown in Table 1 above, due to the uneven manufacturing process, the subthreshold swing test data in different positions are different. In Table 1, the area located around column 1, rows 8 to 10 in the group A motherboard has higher subthreshold swing test data, and the positions located around column 1, rows 1 to 3 in the group B motherboard, column 1, rows 17 to 19 in the group B motherboard, etc., have lower subthreshold swing test data. The difference between the higher sub-threshold swing test data and the lower sub-threshold swing test data is about 20% of the lower sub-threshold swing test data.

Based on this, when driving parameter debugging is performed in the related technologies, a current display panel to be debugged will record the driving parameter information of the last display panel to be debugged when the driving parameters of the current display panel to be debugged are debugged. If the span between the position of the last display panel to be debugged and the position of the current display panel to be debugged is large, it will lead to a larger offset of driving parameters, increase debugging times of driving parameters, and then increase debugging duration of driving parameters. Meanwhile, because a fixture needs to ensure that all products are debugged before the next round, it may indirectly lengthen an originally short driving parameter debugging duration to the maximum debugging duration of the current batch of products, which will waste production capacity, and the display panel to be debugged will be marked as a bad product due to a long debugging duration, resulting in a lower yield of the product.

In order to solve the above problems, the embodiments of the present application provides a method, an apparatus and an electronic device for debugging driving parameters of a display panel. The embodiments of the method, apparatus and electronic device for debugging driving parameters of a display panel will be described below in conjunction with the drawings.

FIG. 1 shows a schematic flow diagram of a method for debugging driving parameters of a display panel provided according to the embodiments of the present application.

As shown in FIG. 1, the method for debugging driving parameters of a display panel provided according to the embodiments of the present application can be applied to electronic devices, and the method for debugging driving parameters of a display panel may include S110 to S130.

In S110, obtaining position information of the display panel to be debugged on a motherboard to which the display panel to be debugged belongs.

In S120, determining first target driving parameter information of the display panel to be debugged according to the position information.

In S130, debugging the driving parameters of the display panel to be debugged according to the first target driving parameter information.

According to the method, apparatus and electronic device for debugging driving parameters of the display panel provided by the embodiments of the present application, the first target driving parameter information of the display panel to be debugged is determined by the position information of the display panel to be debugged on the motherboard to which the display panel to be debugged belongs. Since the first target driving parameter information of the display panel to be debugged determined based on the position information is closer to the actual driving parameter information burned to the driver IC, when debugging the driving parameters of the display panel to be debugged based on the first target driving parameter information, the debugging times of the display panel to be debugged can be reduced, which is conductive to shorten the debugging duration of the driving parameters of the display panel, improve the debugging efficiency of the driving parameters, and improve the yield rate of the display panel to be debugged.

The specific implementation of the above steps will be described in detail below.

First of all, S110 is introduced.

A motherboard may include a plurality of display panels to be debugged. Before debugging the driving parameters of the display panels to be debugged on the motherboard, the display panels to be debugged can be cut out from the motherboard so that the display panels to be debugged can be debugged separately later.

The position information of the display panel to be debugged on the motherboard to which the display panel belongs can be unique position information of the display panel to be debugged on its motherboard, or area information of the display panel to be debugged on its motherboard.

As an example, the motherboard can be divided into group A and group B for cutting. Each of group A motherboard and group B motherboard may include 19 rows and 5 columns, that is, each of group A motherboard and group B motherboard may include 19×5=95 display panels to be debugged. Group A motherboard and group B motherboard can be divided into 36 areas according to experience. Specifically, the 36 areas can be a first area, a second area, a third area . . . , a $36^{th}$ area. As shown in Table 1, the first area may include the first column, first to third row of the group A motherboard. The position information of the display panel to be debugged on the motherboard can be the first row and the first column of the group A motherboard, or it can be the first area. Of course, the present application just takes the motherboard including group A motherboard and group B motherboard, each group of motherboard consisting of 19 rows and 5 columns, and the motherboard being divided into 36 areas as an example, but it is not limited.

Figure 2:
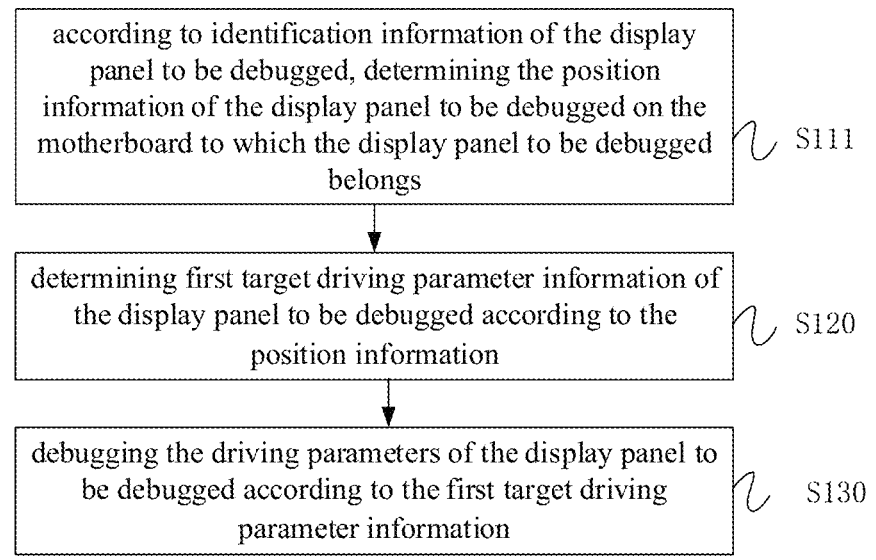
FIG. 2 shows another schematic flow diagram of the method for debugging driving parameters of the display panel provided according to the embodiments of the present application.

In some alternative embodiments, as shown in FIG. 2, obtaining the position information of the display panel to be debugged on the motherboard to which the display panel to be debugged belongs may include:

In S111, according to identification information of the display panel to be debugged, determining the position information of the display panel to be debugged on the motherboard to which the display panel to be debugged belongs.

In this implementation, through the identification information of the display panel to be debugged, the position information of the display panel to be debugged on the motherboard can be accurately determined.

The identification information of the display panel to be debugged can be used to indicate the position of the display panel to be debugged on the motherboard to which it belongs. For example, the identification information of the display panel to be debugged can be the identity document (ID) of the display panel to be debugged.

As an example, an electronic device may store the mapping relationship between the identification information of the display panel to be debugged and the position information of the display panel to be debugged on the motherboard. Therefore, according to the identification information of the display panel to be debugged and the mapping relationship between the identification information of the display panel to be debugged and the position information of the display panel to be debugged on the motherboard, the position information of the display panel to be debugged on the motherboard can be determined.

As another example, the identification information of the display panel to be debugged may include the position information of the display panel to be debugged on the motherboard, and by decoding the identification information of the display panel to be debugged, the location information of the display panel to be debugged on the motherboard may be obtained.

Optionally, before debugging the driving parameters, the display panel to be debugged may be marked according to the position of the display panel to be debugged on the motherboard, and the identification information of the display panel to be debugged may be obtained.

Next, S120 is introduced.

The first target driving parameter information may be parameter information used to drive the display panel for display.

As an example, the first target driving parameter information may include at least one of a display luminance value (DBV), Gamma data, lowest gray-scale voltage data (vgmp), highest gray-scale voltage data (vgsp), high level (VGH), low level (VGL), a first power supply voltage and a second power supply voltage. The first power supply voltage may be one of positive power supply (PVDD) and negative power supply (PVEE), and the second power supply voltage may be the other of the positive power supply and the negative power supply.

Figure 3:
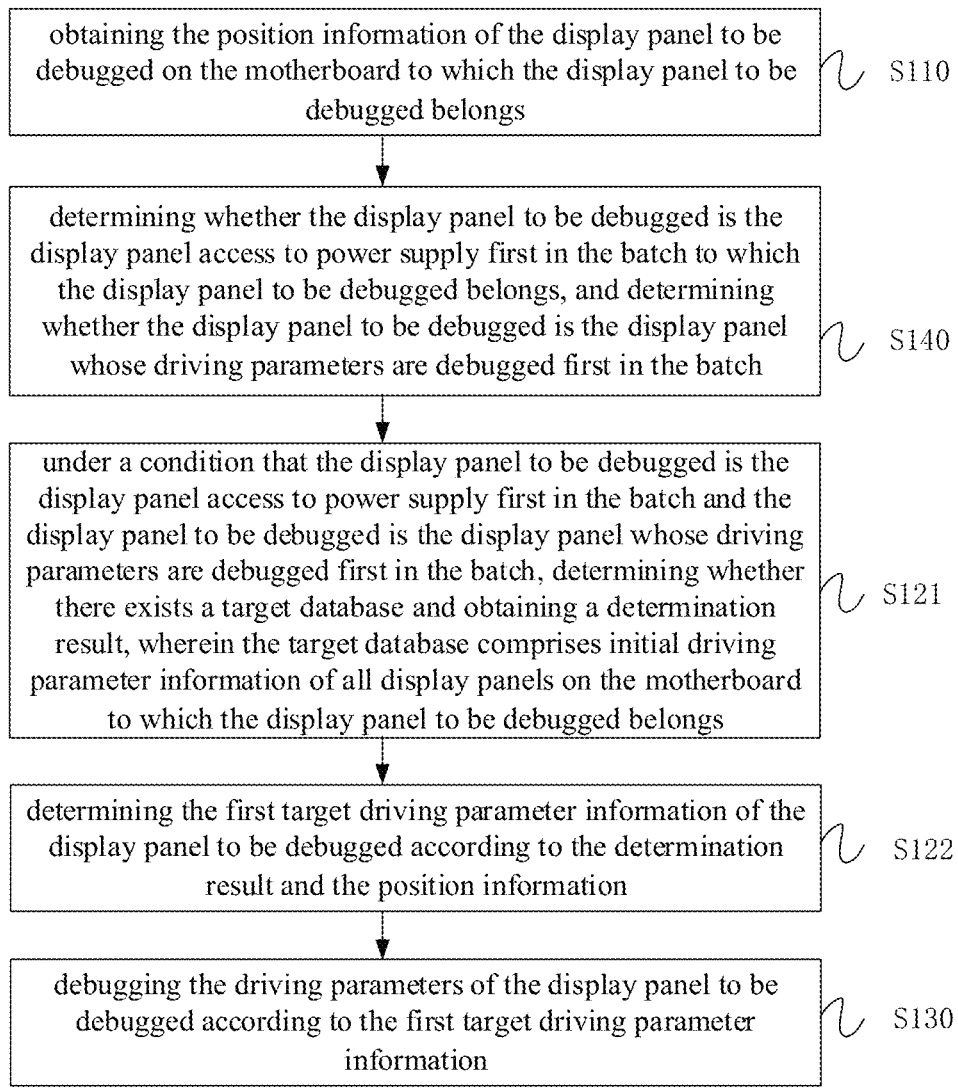
FIG. 3 shows yet another schematic flow diagram of the method for debugging driving parameters of the display panel provided according to the embodiments of the present application.

In some optional embodiments, as shown in FIG. 3, the method for debugging the driving parameters of the display panel may also include S140 after S110 and before S120.

In S140, determining whether the display panel to be debugged is the display panel access to power supply first in the batch to which the display panel to be debugged belongs, and determining whether the display panel to be debugged is the display panel whose driving parameters are debugged first in the batch.

S120 may also include S121 and S122.

In S121, under a condition that the display panel to be debugged is the display panel access to power supply first in the batch and the display panel to be debugged is the display panel whose driving parameters are debugged first in the batch, determining whether there exists a target database and obtaining a determination result, wherein the target database comprises initial driving parameter information of all display panels on the motherboard to which the display panel to be debugged belongs.

In S122, determining the first target driving parameter information of the display panel to be debugged according to the determination result and the position information.

In this implementation, when the display panel to be debugged is the display panel access to the power supply first in the batch and the display panel to be debugged is the display panel whose driving parameters are debugged first in the batch, the first target driving parameter information of the display panel to be debugged may be determined based on the determination result, so as to improve the accuracy of the first target driving parameter information of the display panel to be debugged.

In S140, according to the identification information of the display panel to be debugged, whether the display panel to be debugged is the display panel access to the power supply first in the batch to which the display panel to be debugged belongs may be determined.

As an example, if the identification information of the display panel to be debugged is not included in the target database, it is determined that the display panel to be debugged is the display panel access to power supply first in the batch; if the identification information of the display panel to be debugged is included in the target database, it is determined that the display panel to be debugged is not the display panel access to power supply first in the batch.

As another example, the electronic device may store a power access record of the display panel, and according to the power access record, it can be determined whether the display panel to be debugged is the display panel access to power supply first in the batch.

Alternatively, the electronic device may store a burning record of a driver integrated circuit (IC), and it can be determined whether the display panel to be debugged is the display panel whose driving parameters are debugged first in the batch based on the burning record.

In S121, the electronic device can store a database creation record, and whether the target database exists or not may be determined according to the database creation record.

The target database may include the initial driving parameter information of all display panels in the motherboard to which the display panel to be debugged belongs. The initial driving parameter information of all display panels can be empirical values. In the initial driving parameter information of all display panels, the corresponding initial driving parameter information of respective display panels can be the same or different, which is not limited herein.

The determination result may include the presence of the target database and the absence of the target database.

Figure 4:
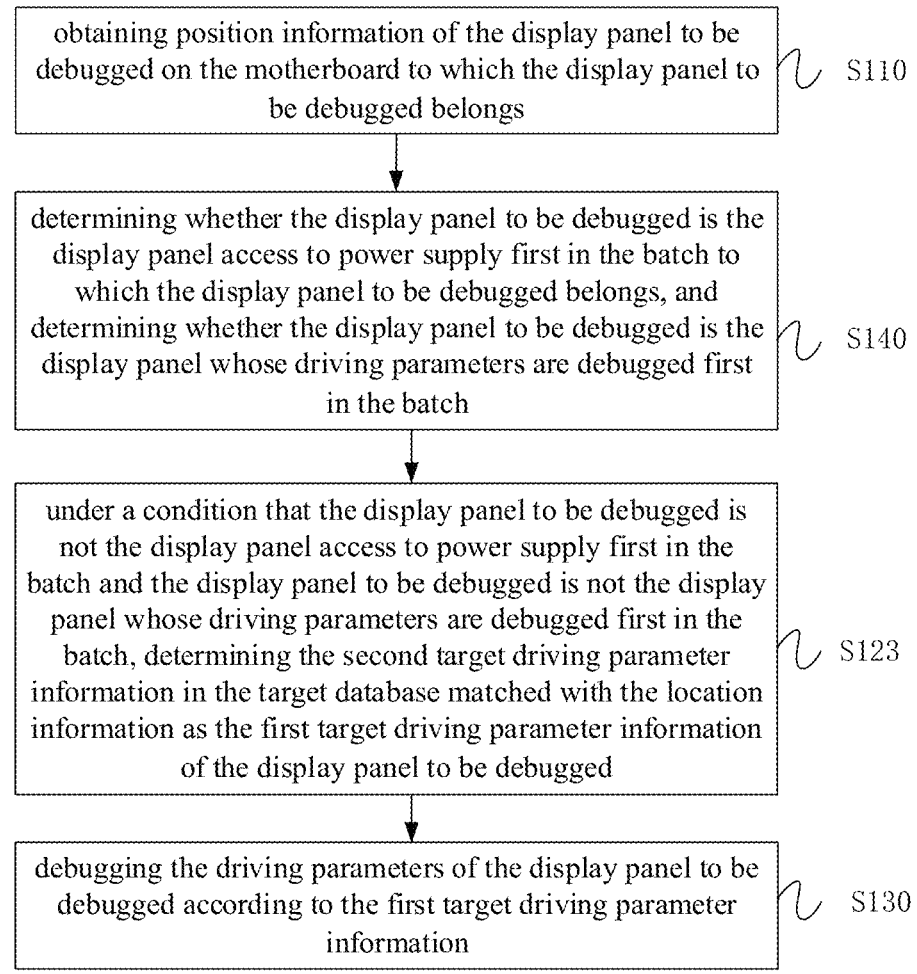
FIG. 4 shows yet another schematic flow diagram of the method for debugging driving parameters of the display panel provided according to the embodiments of the present application.

In some alternative embodiments, as shown in FIG. 4, S120 may include S123 after S140.

In S123, under a condition that the display panel to be debugged is not the display panel access to power supply first in the batch and the display panel to be debugged is not the display panel whose driving parameters are debugged first in the batch, determining the second target driving parameter information in the target database matched with the location information as the first target driving parameter information of the display panel to be debugged.

In this implementation, since the first target driving parameter information of the display panel to be debugged determined according to the position information is closer to the actual driving parameter information burned to the driver IC. In the case that the display panel to be debugged is not the display panel access to power supply first in the batch and the display panel to be debugged is not the display panel whose driving parameters are debugged first in the batch, the location information is used as the basis for filtering the second target driving parameter information in the target database, and the filtered second target driving parameter information is taken as the first target driving parameter information of the display panel to be debugged, when debugging the driving parameters of the display panel to be debugged based on the first target driving parameter information, the debugging times of the display panel to be debugged can be reduced, which is conductive to shorten the debugging duration of the driving parameters of the display panel, improve the debugging efficiency of the driving parameters, and improve the yield rate of the display panel to be debugged.

The second target driving parameter information may be the driving parameter information of the display panel to be debugged when the debugging of the driving parameters of the display panel is successful.

When the display panel to be debugged is not the display panel access to power supply first in the batch and the display panel to be debugged is the display panel whose driving parameters are debugged first in the batch, it means that in the batch to which the display panel to be debugged belongs, some display panels have been access to the power supply and their driving parameters have been debugged, then there exists a target database in the electronic device, and the target database may include the second target driving parameter information.

Figure 5:
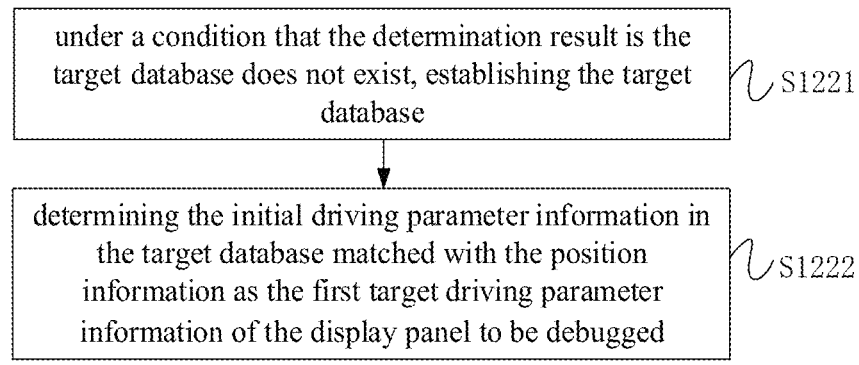
FIG. 5 shows yet another schematic flow diagram of the method for debugging driving parameters of the display panel provided according to the embodiments of the present application.

In some alternative embodiments, as shown in FIG. 5, S122 may include S1221 and S1222.

In S1221, under a condition that the determination result is the target database does not exist, establishing the target database.

In S1222, determining the initial driving parameter information in the target database matched with the position information as the first target driving parameter information of the display panel to be debugged.

In the embodiment, when the determination result is that there is no target database, a basis for subsequent driving parameter debugging is established by establishing the target database and determining the initial driving parameter information in the target database matched with the position information as the first target driving parameter information of the display panel to be debugged.

In S1221, establishing the target database may include: obtaining the initial driving parameter information of all display panels in the motherboard to which the display panel to be debugged belongs, and establishing the target database according to the initial driving parameter information of all display panels in the motherboard to which the display panel to be debugged belongs.

Obtaining the initial driving parameter information of all the display panels in the motherboard to which the display panel to be debugged belongs may include: directly obtaining the initial driving parameter information of all the display panels in the motherboard to which the display panel to be debugged belongs from the electronic device which has stored the initial driving parameter information. Alternatively, in response to a user's input operation based on the electronic device, the electronic device can determine the initial driving parameter information of all the display panels in the motherboard to which the display panel to be debugged belongs, which is corresponding to the input operation.

In S1222, the electronic device can store the mapping relationship between the location information and the initial driving parameter information. Therefore, according to the location information and the mapping relationship between the location information and the initial driving parameter information, the initial driving parameter information matched with the position information may be filtered from the target database, and then the initial driving parameter information may be determined as the first target driving parameter information of the display panel to be debugged.

Figure 6:
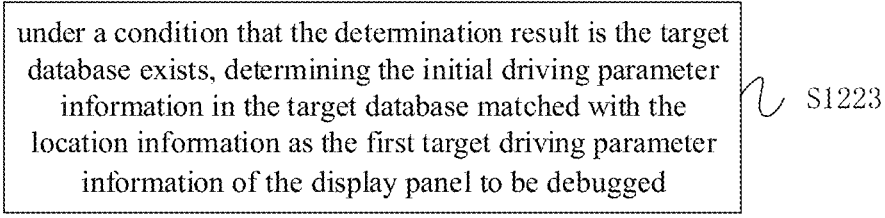
FIG. 6 shows yet another schematic flow diagram of the method for debugging driving parameters of the display panel provided according to the embodiments of the present application.

In some alternative embodiments, as shown in FIG. 6, S122 may include S1223.

In S1223, under a condition that the determination result is the target database exists, determining the initial driving parameter information in the target database matched with the location information as the first target driving parameter information of the display panel to be debugged.

In this implementation, when the determination result is that the target database exists, a basis for subsequent driving parameter debugging is provided by determining the initial driving parameter information in the target database matched with the location information as the first target driving parameter information of the display panel to be debugged.

The electronic device can store the mapping relationship between the location information and the initial driving parameter information. Therefore, according to the location information and the mapping relationship between the location information and the initial driving parameter information, the initial driving parameter information matched with the position information may be filtered from the target database, and then the initial driving parameter information may be determined as the first target driving parameter information of the display panel to be debugged.

Figure 7:
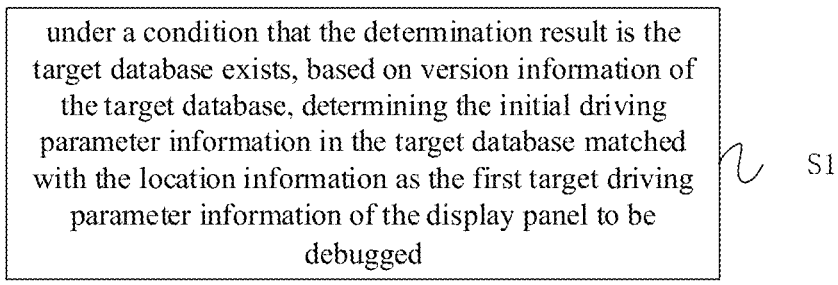
FIG. 7 shows yet another schematic flow diagram of the method for debugging driving parameters of the display panel provided according to the embodiments of the present application.

In some alternative embodiments, as shown in FIG. 7, determining the initial driving parameter information in the target database matched with the location information as the first target driving parameter information of the display panel to be debugged may include S1.

In S1, based on the version information of the target database, determining the initial driving parameter information in the target database matched with the location information as the first target driving parameter information of the display panel to be debugged.

In this implementation, with the first target driving parameter information of the display panel to be debugged determined by comprehensively considering the version information of the target database and the location information of the display panel to be debugged, the accuracy of the first target driving parameter information of the display panel to be debugged can be further improved.

In the embodiments of the present application, the version information of the target database may be or may not be the latest version information. The version information of the target database being the latest version information and the version information of the target database not being the latest version information will be explained below.

In some alternative embodiments, as shown in FIG. 8, S1 may include S11.

In S11, under a condition that the version information of the target database is the latest version information, determining the initial driving parameter information in the target database matched with the location information as the first target driving parameter information of the display panel to be debugged.

In this implementation, when the version information of the target database is the latest version information, the accuracy of the first target driving parameter information of the display panel to be debugged may be further improved by determining the initial driving parameter information in the target database matched with the location information as the first target driving parameter information of the display panel to be debugged.

In the embodiments of the application, when the version information of the target database is the latest version information, it can be considered that the target database includes the initial driving parameter information corresponding to all the position information in the motherboard to which the display panel to be debugged belongs. Therefore, when the version information of the target database is the latest version information, the initial driving parameter information matched with the location information can be filtered directly from the target database, and the filtered initial driving parameter information is taken as the first target driving parameter information of the display panel to be debugged.

In some alternative embodiments, as shown in FIG. 9, S1 may further include S12 and S13.

In S12, under a condition that the version information of the target database is not the latest version information, obtaining an updated target database by updating missing initial driving parameter information in the target database to the target initial driving parameter information, wherein the updated target database is the target database corresponding to the latest version information, and the target initial driving parameter information is the initial driving parameter information stored in a fixture.

In S13, determining the initial driving parameter information in the updated target database matched with the location information as the first target driving parameter information of the display panel to be debugged.

In this implementation, when the version information of the target database is not the latest version information, the accuracy of the first target driving parameter information of the display panel to be debugged may be further improved by obtaining an updated target database by updating the missing initial driving parameter information in the target database to the target initial driving parameter information and determining the initial driving parameter information in the updated target database matched with the location information as the first target driving parameter information of the display panel to be debugged.

In S12, the target initial driving parameter information can be the initial driving parameter information stored in the fixture, and the initial driving parameter information can be empirical values.

In the embodiments of the present application, if the version information of the target database is not the latest version information, it can be considered that there is missing initial driving parameter information in the target database. In order to avoid the lack of the initial driving parameter information matched with the location information in the database, and then affecting the subsequent debugging of the driving parameters, it is necessary to update the missing initial driving parameter information in the target database to the target initial driving parameter information.

In other words, if the version information of the target database is not the latest version information, the version information of the target database may be updated to the latest version information by updating the missing initial driving parameter information in the target database to the target initial driver parameter information.

Next, S130 is introduced.

In S130, the driving parameters of the display panel to be debugged may be debugged according to the first target driving parameter information, which can reduce the debugging times of the display panel to be debugged, thus shorten the debugging duration of the driving parameters of the display panel, improve the debugging efficiency of the driving parameters, and improve the yield rate of the display panel to be debugged.

Driving parameter debugging can be understood as One Time Programmable (OTP) debugging. The second target driving parameter information obtained after successful debugging of the driving parameters can be written into the driver IC, so as to save the display effect of the display panel.

Figure 10:
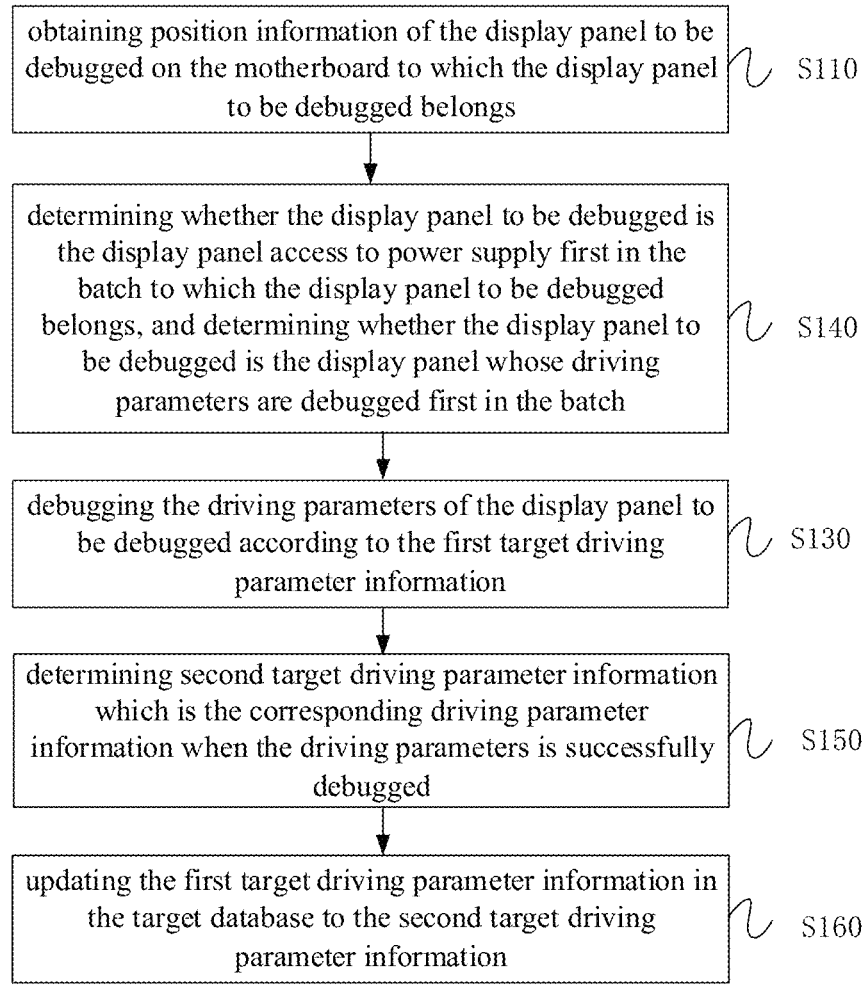
FIG. 10 shows yet another schematic flow diagram of the method for debugging driving parameters of the display panel provided according to the embodiments of the present application.

In some optional embodiments, as shown in FIG. 10, the method for debugging the driving parameter of the display panel may also include S150 to S160 after S130.

In S150, determining a second target driving parameter information which is the corresponding driving parameter information when the driving parameters is successfully debugged.

In S160, updating the first target driving parameter information in the target database to the second target driving parameter information.

In this implementation, the first target driving parameter information in the target database is updated to the second target driving parameter information, so that when subsequently debugging the driving parameters of a display panel with the same position information as the display panel to be debugged on the motherboard of the display panel to be debugged in the same batch, or when subsequently debugging the driving parameters of a display panel with the same position information as the display panel to be debugged on the motherboards other than the motherboard to which the display panel to be debugged belongs in the same batch, the second target driving parameter information can be called, so as to reduce the debugging times of the display panel to be debugged, which is beneficial to shorten the debugging duration of the driving parameters of the display panel, improve the debugging efficiency of the driving parameters, and improve the yield rate of the display panel to be debugged.

As an example, if the first target driving parameter information in the target database is a display luminance value of 200 Nit, and the second target driving parameter information is a display luminance value of 195 Nit, the display luminance value in the target database is updated from 200 Nit to 195 Nit.

Figure 11:
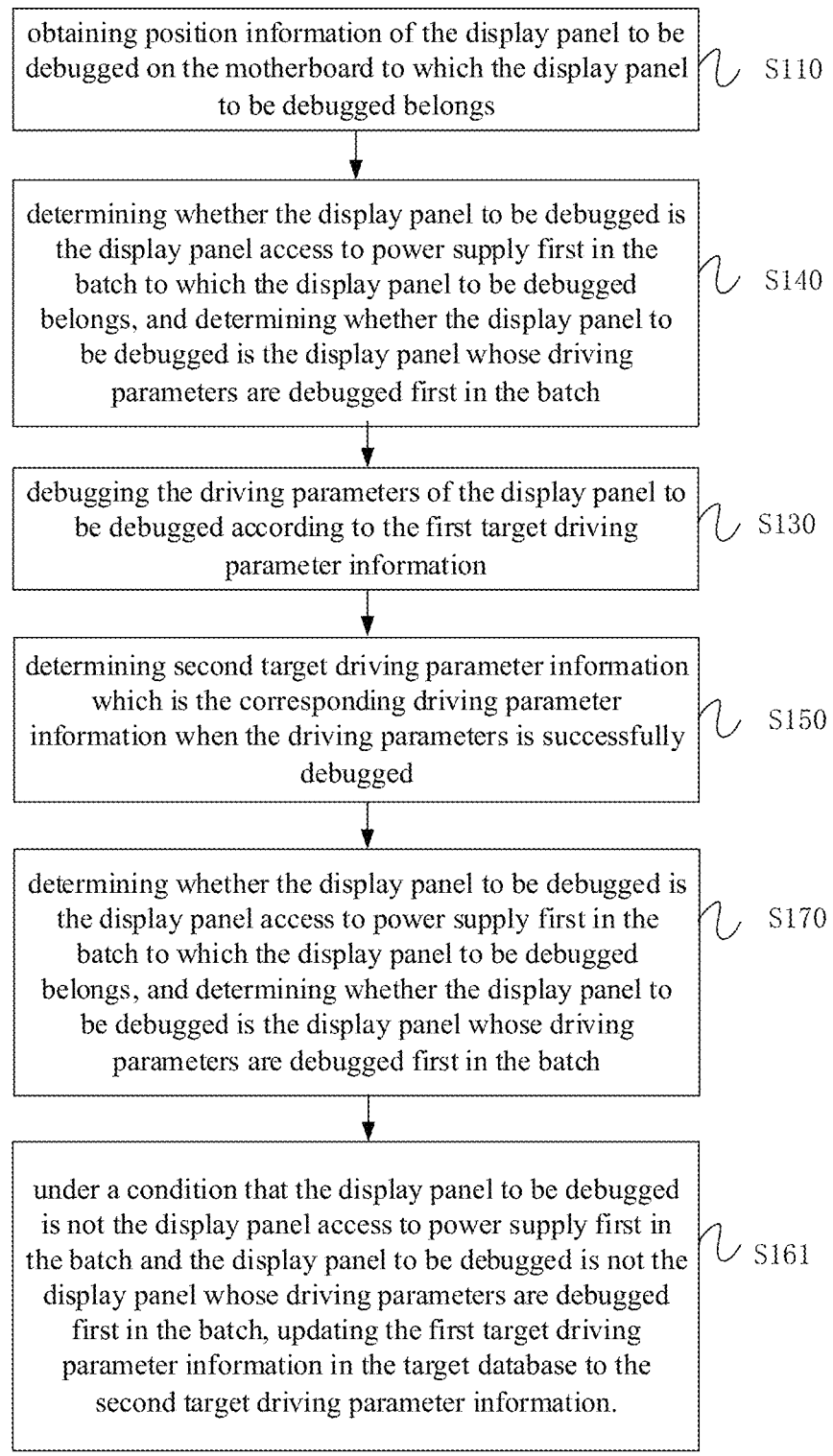
FIG. 11 shows yet another schematic flow diagram of the method for debugging driving parameters of the display panel provided according to the embodiments of the present application.

In some alternative embodiments, as shown in FIG. 11, after S150 and before S160, the method for debugging the driving parameters of the display panel may also include S170.

In S170, determining whether the display panel to be debugged is the display panel access to power supply first in the batch to which the display panel to be debugged belongs, and determining whether the display panel to be debugged is the display panel whose driving parameters are debugged first in the batch.

S160 can include S161.

In S161, under a condition that the display panel to be debugged is not the display panel access to power supply first in the batch and the display panel to be debugged is not the display panel whose driving parameters are debugged first in the batch, updating the first target driving parameter information in the target database to the second target driving parameter information.

In this implementation, when the display panel to be debugged is not the display panel access to power supply first in the batch and the display panel to be debugged is not the display panel whose driving parameters are debugged first in the batch, the first target driving parameter information in the target database is updated to the second target driving parameter information, so that when subsequently debugging the driving parameters of a display panel with the same position information as the display panel to be debugged on the motherboard of the display panel to be debugged in the same batch, or when subsequently debugging the driving parameters of a display panel with the same position information as the display panel to be debugged on the motherboards other than the motherboard to which the display panel to be debugged belongs in the same batch, the second target driving parameter information can be called, so as to reduce the debugging times of the display panel to be debugged, which is beneficial to shorten the debugging duration of the driving parameters of the display panel, improve the debugging efficiency of the driving parameters, and improve the yield rate of the display panel to be debugged.

The specific implementation of S170 is the same as that of S140, which will not be repeat herein.

As an example, the first target driving parameter information of the display panel to be debugged in the target database is a display luminance value of 200 Nit, and the second target driving parameter information of the display panel to be debugged is a display luminance value of 195 Nit. When the display panel to be debugged is not the display panel access to power supply first in the batch and the display panel to be debugged is not the display panel whose driving parameters are debugged first in the batch, the display luminance value in the target database is updated from 200 Nit to 195 Nit.

Figure 12:
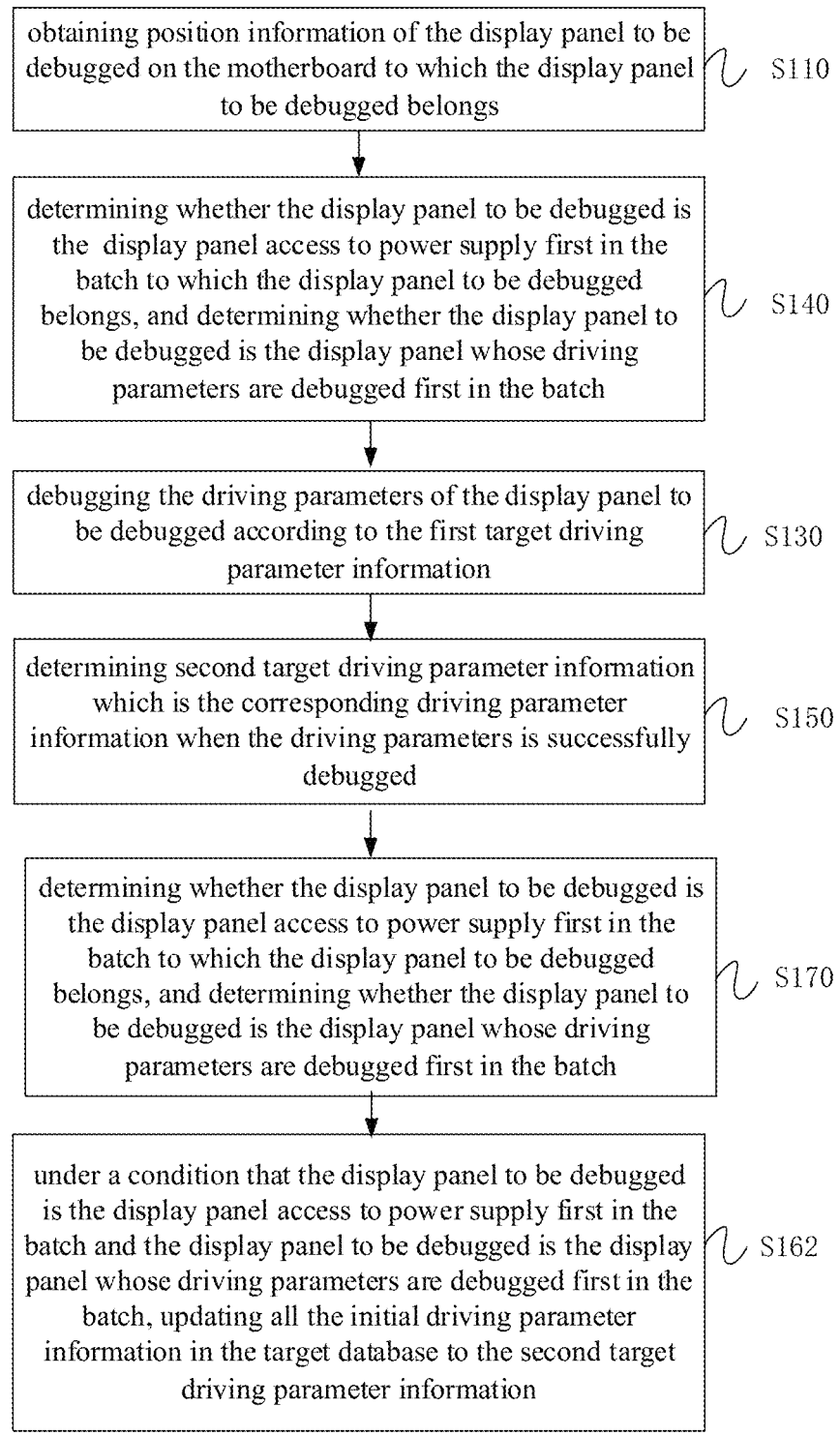
FIG. 12 shows yet another schematic flow diagram of the method for debugging driving parameters of the display panel provided according to the embodiments of the present application.

In some alternative embodiments, as shown in FIG. 12, S160 may also include S162 after S170.

In S162, under a condition that the display panel to be debugged is the display panel access to power supply first in the batch and the display panel to be debugged is the display panel whose driving parameters are debugged first in the batch, updating all the initial driving parameter information in the target database to the second target driving parameter information.

In this implementation, when the display panel to be debugged is the display panel access to power supply first in the batch and the display panel to be debugged is the display panel whose driving parameters are debugged first in the batch, since the difference between the second target driving parameter information of the display panels to be debugged with different position information in the same batch is smaller than the difference between the second target driving parameter information and the initial driving parameter information of the display panel to be debugged, updating all the initial driving parameter information in the target database to the second target driving parameter information may further reduce the debugging times of the display panel to be debugged, which is beneficial to shorten the debugging duration of the driving parameters of the display panel, improve the debugging efficiency of the driving parameters, and improve the yield rate of the display panel to be debugged.

As an example, all the initial driving parameter information in the target database is a display luminance value of 180 Nit, the first target driving parameter information in the target database is a display luminance value of 200 Nit, and the second target driving parameter information is the display luminance value of 195 Nit. When the display panel to be debugged is the display panel access to power supply first in the batch and the display panel to be debugged is the display panel whose driving parameters are debugged first in the batch, all the initial driving parameters in the target database are updated from the display luminance value of 180 Nit to the display luminance value of 195 Nit.

Figure 13:
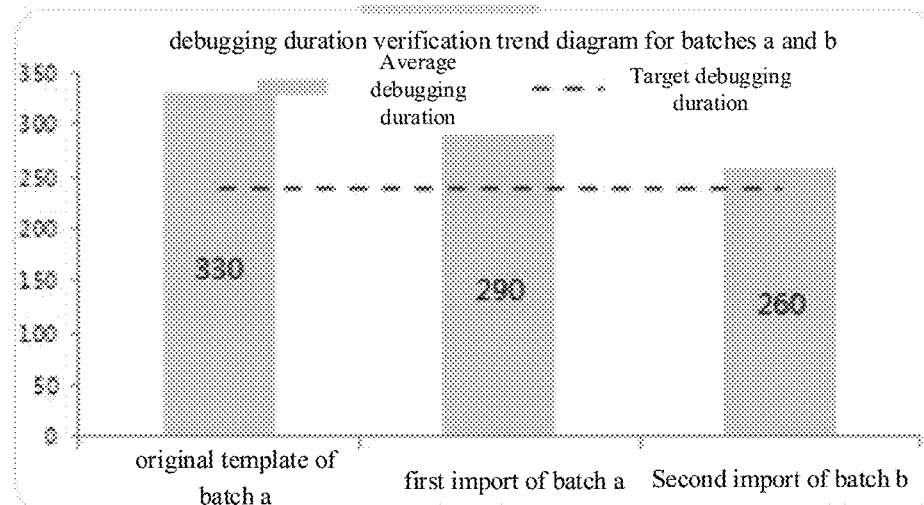
FIG. 13 shows a debugging duration verification trend diagram for batches a and b provided according to the embodiments of the present application.

As shown in FIG. 13, the average debugging duration (TT) imported by the original template of batch a in FIG. 13 is 330 s, which can be understood as the average debugging duration of driving parameters of batch a in related technologies is 330 s. The average debugging duration of the first import of batch a is 290 s, which can be understood as when the first target driving parameter information is the initial driving parameter information, the average debugging duration of batch a is 290 s. The average debugging duration of the second import of batch b is 260 s, which can be understood as when the first target driving parameter information is the second target driving parameter information, the average debugging duration of batch b is 260 s. It can be seen that the embodiments of the present application can shorten the average debugging duration of the driving parameters of the display panel, that is, it can shorten the debugging duration of the driving parameters of the display panel and improve the debugging efficiency of the driving parameters.

Figure 14:
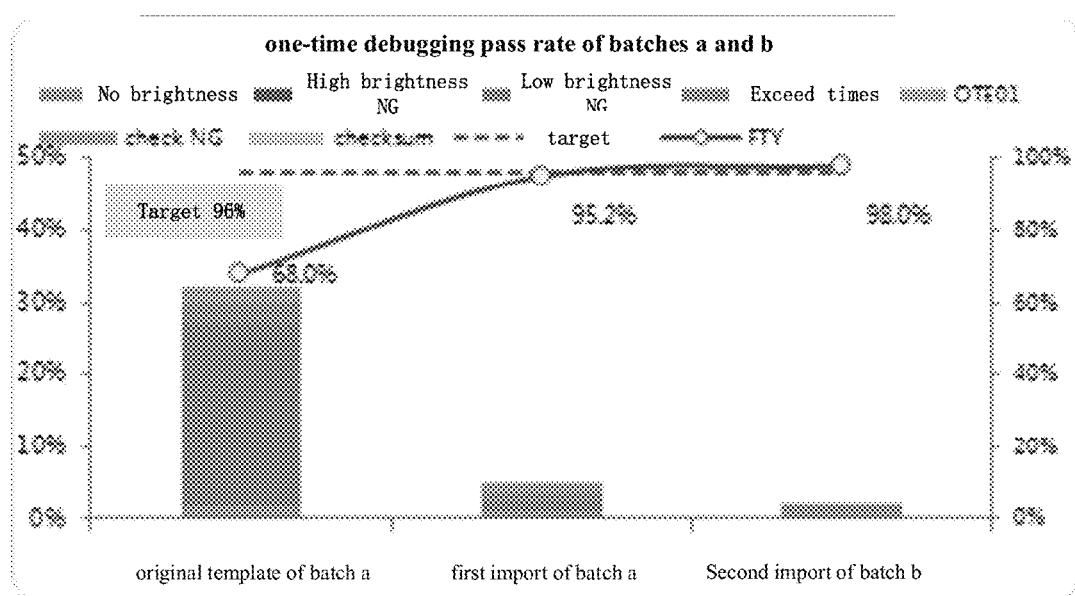
FIG. 14 shows a first time pass rate trend diagram for batches a and b provided by the embodiments of the present application.

As shown in FIG. 14, the one-time debugging pass rate (FTY) of batch a in the related technologies is 68.0%. When the first target driving parameter information is the initial driving parameter information, the one-time debugging pass rate of batch a is 95.2%. When the first target driving parameter information is the second target driving parameter information, the one-time debugging pass rate of batch b is 98.0%. It can be seen that the embodiments of the present application can improve the one-time debugging pass rate, that is, it can provide the qualified rate of the display panel to be debugged.

Based on the same invention concept, the embodiments of the present application also provides an apparatus for debugging driving parameters of a display panel, which will be described in combination with the drawings below.

Figure 15:
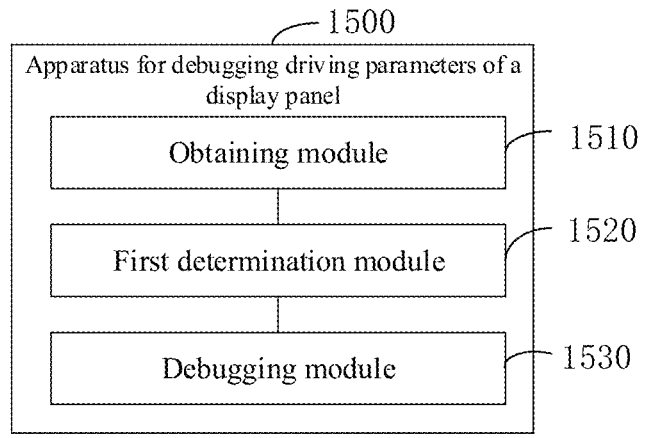
FIG. 15 shows a schematic structure diagram of an apparatus for debugging driving parameters of a display panel provided according to the embodiments of the present application.

As shown in FIG. 15, the apparatus 1500 for debugging driving parameters of a display panel provided by the embodiments of the present application may include an obtaining module 1510, a first determination module 1520 and a debugging module 1530.

The obtaining module 1510 is used for obtaining position information of the display panel to be debugged on a motherboard to which the display panel to be debugged belongs.

The first determination module 1520 is used for determining first target driving parameter information of the display panel to be debugged according to the position information; and The debugging module 1530 is used for debugging the driving parameters of the display panel to be debugged according to the first target driving parameter information.

According to the method, apparatus and electronic device for debugging driving parameters of the display panel provided by the embodiments of the present application, the first target driving parameter information of the display panel to be debugged is determined by the position information of the display panel to be debugged on the motherboard to which the display panel to be debugged belongs. Since the first target driving parameter information of the display panel to be debugged determined based on the position information is closer to the actual driving parameter information burned to the driver IC, when debugging the driving parameters of the display panel to be debugged based on the first target driving parameter information, the debugging times of the display panel to be debugged can be reduced, which is conductive to shorten the debugging duration of the driving parameters of the display panel, improve the debugging efficiency of the driving parameters, and improve the yield rate of the display panel to be debugged.

Figure 16:
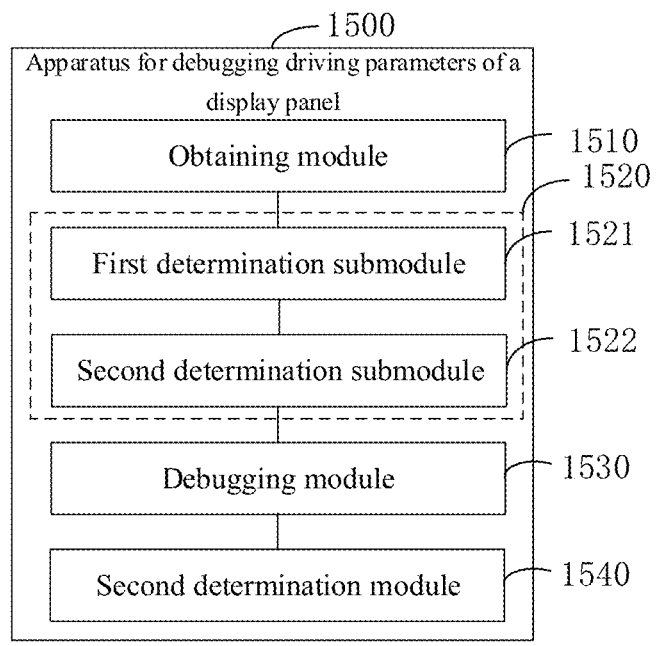
FIG. 16 shows another schematic structure diagram of the apparatus for debugging driving parameters of the display panel provided according to the embodiments of the present application.

In some alternative embodiments, as shown in FIG. 16, the apparatus 1500 for debugging driving parameters of a display panel may also include:

a second determination module 1540 for determining whether the display panel to be debugged is a display panel access to power supply first in a batch to which the display panel to be debugged belongs, and determining whether the display panel to be debugged is a display panel whose driving parameters are debugged first in the batch.

The first determination module 1520 may include:

a first determination submodule 1521 for under a condition that the display panel to be debugged is the display panel access to power supply first in the batch and the display panel to be debugged is the display panel whose driving parameters are debugged first in the batch, determining whether there exists a target database and obtaining a determination result, wherein the target database comprises initial driving parameter information of all display panels on the motherboard to which the display panel to be debugged belongs; and a second determination submodule 1522 for determining the first target driving parameter information of the display panel to be debugged according to the determination result and the position information.

Figure 17:
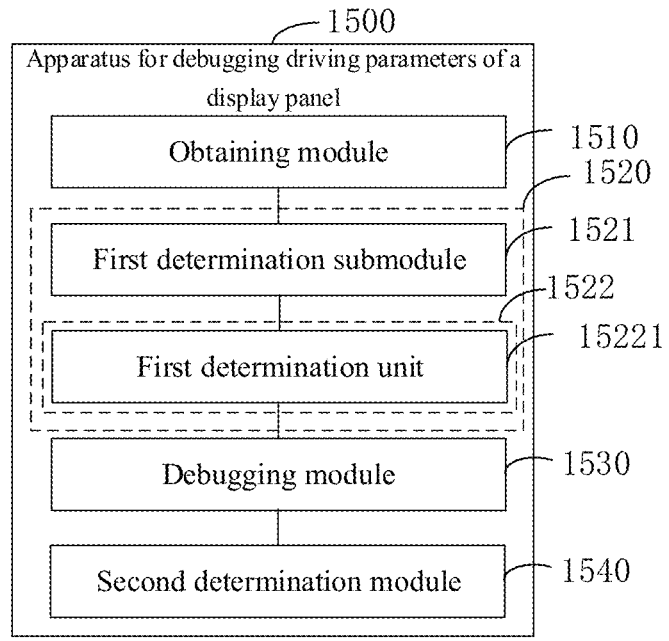
FIG. 17 shows yet another schematic structure diagram of the apparatus for debugging driving parameters of the display panel provided according to the embodiments of the present application.

In some alternative embodiments, as shown in FIG. 17, the second determination sub-module 1522 may include:

a first determination unit 15221 for under a condition that the determination result is the target database exists, determining the initial driving parameter information in the target database matched with the location information as the first target driving parameter information of the display panel to be debugged.

Figure 18:
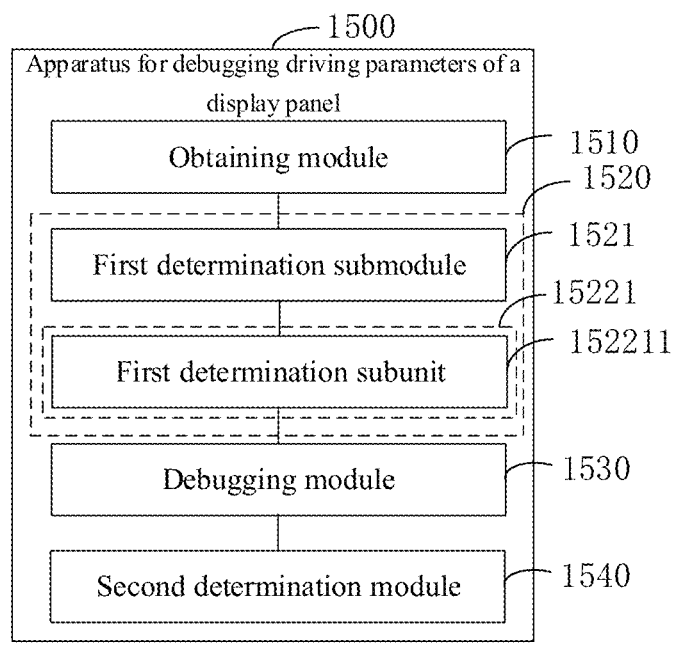
FIG. 18 shows yet another schematic structure diagram of the apparatus for debugging driving parameters of the display panel provided according to the embodiments of the present application.

In some alternative embodiments, as shown in FIG. 18, the first determination unit 15221 may include:

a first determination subunit 152211 for based on version information of the target database, determining the initial driving parameter information in the target database matched with the location information as the first target driving parameter information of the display panel to be debugged.

In some alternative embodiments, the first determination subunit 152211 may be used for under a condition that the version information of the target database is the latest version information, determining the initial driving parameter information in the target database matched with the location information as the first target driving parameter information of the display panel to be debugged.

In some alternative embodiments, the first determination subunit 152211 may be used for under a condition that the version information of the target database is not the latest version information, obtaining an updated target database by updating missing initial driving parameter information in the target database to the target initial driving parameter information, wherein the updated target database is the target database corresponding to the latest version information, and the target initial driving parameter information is the initial driving parameter information stored in a fixture; and determining the initial driving parameter information in the updated target database matched with the location information as the first target driving parameter information of the display panel to be debugged.

In some alternative embodiments, the second determination submodule 1522 may include:

an establishing subunit for under a condition that the determination result is the target database does not exist, establishing the target database;

an second determination subunit for determining the initial driving parameter information in the target database matched with the position information as the first target driving parameter information of the display panel to be debugged.

In some alternative embodiments, the apparatus 1500 for debugging driving parameters of a display panel may also include:

a third determination module for determining second target driving parameter information which is the corresponding driving parameter information when the driving parameters is successfully debugged; and a first update module for updating the first target driving parameter information in the target database to the second target driving parameter information.

In some alternative embodiments, the apparatus 1500 for debugging driving parameters of a display panel may also include:

a fourth determination module for determining whether the display panel to be debugged is a display panel access to power supply first in a batch to which the display panel to be debugged belongs, and determining whether the display panel to be debugged is a display panel whose driving parameters are debugged first in the batch.

The first update module may be used for under a condition that the display panel to be debugged is not the display panel access to power supply first in the batch and the display panel to be debugged is not the display panel whose driving parameters are debugged first in the batch, updating the first target driving parameter information in the target database to the second target driving parameter information.

In some alternative embodiments, the apparatus 1500 for debugging driving parameters of a display panel may also include:

a second update module for under a condition that the display panel to be debugged is the display panel access to power supply first in the batch and the display panel to be debugged is the display panel whose driving parameters are debugged first in the batch, updating all the initial driving parameter information in the target database to the second target driving parameter information.

In some alternative embodiments, the second determination submodule 1522 may be specifically used for: under a condition that the display panel to be debugged is not the display panel access to power supply first in the batch and the display panel to be debugged is not the display panel whose driving parameters are debugged first in the batch, determining the second target driving parameter information in the target database matched with the location information as the first target driving parameter information of the display panel to be debugged.

In some alternative embodiments, the obtaining module 1510 may be specifically used for: according to identification information of the display panel to be debugged, determining the position information of the display panel to be debugged on the motherboard to which the display panel to be debugged belongs.

In some alternative embodiments, the first target driving parameter information may include at least one of a display luminance value, gamma data, lowest gray-scale voltage data, highest gray-scale voltage data, a high level, a low level, a first power supply voltage, and a second power supply voltage.

The apparatus for debugging driving parameters of a display panel provided by the embodiments of the present application can implement each process of the method for debugging driving parameters of a display panel in the embodiments of FIG. 1, and it will not be repeated herein in order to avoid repetition.

Figure 19:
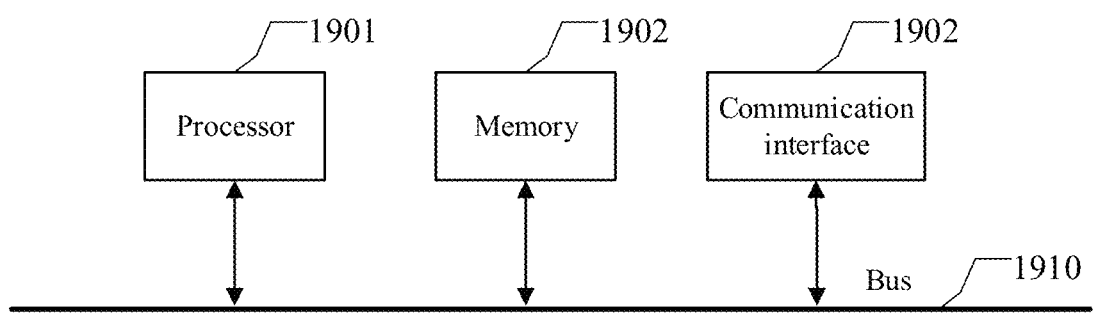
FIG. 19 shows a schematic structure diagram of an electronic device provided according to the embodiments of the present application.

FIG. 19 shows a schematic structure diagram of an electronic device provided according to the embodiments of the present application.

The electronic device may include a processor 1901 and a memory 1902 having computer program instructions stored thereon.

Specifically, the processor 1901 may include a central processing unit (CPU), or Application Specific Integrated Circuit (ASIC), or one or more integrated circuits that may be configured to implement embodiments of the present invention.

The memory 1902 may include a mass memory for data or instructions. For the purpose of illustration rather than limitation, memory 1902 may include a hard disk drive (HDD), floppy disk drive, flash memory, optical disc, magneto-optical disc, magnetic tape or universal serial bus (USB) driver or a combination of two or more of these. Where appropriate, the memory 1902 may include media that can or cannot be removed (or fixed). Where appropriate, the memory 1902 may be inside or outside the integrated gateway disaster recovery device. In a particular embodiment, the memory 1902 is a non-volatile solid-state memory. In a particular embodiment, the memory 1902 includes a read-only memory (ROM). Where appropriate, the ROM may be mask programmed ROM, programmable ROM (PROM), erasable PROM (EPROM), electrically erasable PROM (EEPROM), electrically rewritable ROM (EAROM) or flash memory, or a combination of two or more of these. As an example, the memory may include a non-volatile transient memory.

The processor 1901 realizes a method for debugging driving parameters of a display panel in any one of the above embodiments by reading and executing the computer program instructions stored in the memory 1902.

In one example, the electronic device may also include a communication interface 1903 and a bus 1910. As shown in FIG. 19, the processor 1901, the memory 1902 and the communication interface 1903 are connected through the bus 1710 and communicate with each other.

The communication interface 1903 is mainly used for realizing communication between modules, devices, units and/or devices in the embodiments of the present application.

Bus 1910 includes hardware, software or both and couples components of electronic devices to each other. For the purpose of illustration rather than limitation, the bus may include an accelerated graphics port (AGP) or other graphics buses, an enhanced industrial standard architecture (EISA) bus, a front-end bus (FSB), overtransfer (HT) interconnection, an industrial standard architecture (ISA) bus, unlimited bandwidth interconnection, a low pin count (LPC) bus, a memory bus, a microchannel architecture (MCA) bus, a peripheral component interconnect (PCI) bus, a PCI-Express (PCI-X) bus, a Serial Advanced Technology attachment (SATA) bus, a Video Electronic Standards Association Local (VLB) bus or other suitable bus or combination of two or more of these. Where appropriate, the bus 1710 may include one or more buses. Although the embodiments of the present invention describe and show a particular bus, the present application considers any suitable bus or interconnection.

The electronic device can execute the method for debugging driving parameters of a display panel in the embodiments of the present application, thereby realizing the method for debugging driving parameters of a display panel and the apparatus for debugging driving parameters of a display panel described in combination with FIGS. 1-12 and 15-18.

The embodiments of the present application also provides a computer-readable storage medium on which a computer program is stored. The computer program, when executed by the processor, implements the method for debugging driving parameters of a display panel in the above embodiments, and the same technical effect can be achieved, in order to avoid repetition, which will not be repeated herein. The above computer-readable storage medium can include Read-Only Memory (ROM), Random Access Memory (RAM), disk or CD, etc., which is not limited herein.

The function blocks shown in the structural block diagram described above may be implemented as hardware, software, firmware or a combination of them. When implemented in hardware, it may be, for example, electronic circuits, application-specific integrated circuits (ASIC), appropriate firmware, plug-ins, function cards, and the like. When implemented in software, the elements of this application are the programs or code snippets that are used to perform the required tasks. A program or code snippet may be stored in a machine-readable medium or transmitted over a transmission medium or communication link through a data signal carried in the carrier. A "computer-readable medium" can include any medium that can store or transmit information.

Examples of the computer-readable medium include electronic circuits, semiconductor memory devices, ROM, flash memory, erasable ROM (EROM), floppy disks, CD-ROM, optical discs, hard disks, optical fiber medium, radio frequency links, and so on. Code snippets can be downloaded via computer networks such as the Internet, intranet, etc.

According to the embodiments of the present application, the computer-readable storage medium may be a non-transient computer-readable storage medium.

It should also be noted that the exemplary embodiments referred to in this application describe some methods or systems based on a series of steps or devices. However, the present application is not limited to the order of the above steps, that is, the steps may be performed in the order mentioned in the embodiments, different from the order in the embodiments, or several steps may be performed at the same time.

The embodiments of the present application also provide a computer program product, which includes a computer program, and the computer program when executed by the processor implement the method for debugging driving parameters of a display panel as described in the embodiments above.

Various aspects of this application are described above with reference to methods, apparatuses (systems) and flow charts and/or block diagrams of computer program products according to embodiments of this application. It should be understood that each block in the flowchart and/or block diagram and the combination of the blocks in the flowchart and/or block diagram can be implemented by computer program instructions. These computer program instructions may be provided to processors of general-purpose computers, dedicated computers, or other programmable data processing devices to generate a machine, so that these instructions executed by the processor of the computer or other programmable data processing device enable the implementation of the functions/actions specified in the flowchart and/or block diagram. The processor may be, but is not limited to, a general-purpose processor, a dedicated processor, a special application processor, or a field programmable logic circuit. It is also understood that each block in the block diagram and/or flowchart and the combination of blocks in the block diagram and/or flowchart may also be implemented by dedicated hardware that performs a specified function or action, or by a combination of dedicated hardware and computer instructions.

In accordance with the embodiments of this application as described above, these embodiments do not describe all the details in detail, nor do they limit the application to the specific embodiments described. It's clear that, according to the above description, many modifications and changes can be made. These embodiments are selected and specifically described in this specification in order to better explain the principle and practical application of this application, so that technicians in the technical field can make good use of this application and modify and use this application on the basis of this application. This application is limited only by the claims and its full scope and equivalents.

What is claimed is:

1. A method for debugging driving parameters of a display panel, comprising:
   obtaining position information of the display panel to be debugged on a motherboard to which the display panel to be debugged belongs;
   determining first target driving parameter information of the display panel to be debugged according to the position information; and debugging the driving parameters of the display panel to be debugged according to the first target driving parameter information, wherein after obtaining the position information of the display panel to be debugged on the motherboard to which the display panel to be debugged belongs, and before determining the first target driving parameter information of the display panel to be debugged according to the position information, the method further comprises:

determining whether the display panel to be debugged is a display panel access to power supply first in a batch to which the display panel to be debugged belongs, and determining whether the display panel to be debugged is a display panel whose driving parameters are debugged first in the batch;

wherein determining the first target driving parameter information of the display panel to be debugged according to the position information comprises:

under a condition that the display panel to be debugged is the display panel access to power supply first in the batch and the display panel to be debugged is the display panel whose driving parameters are debugged first in the batch, determining whether there exists a target database and obtaining a determination result, wherein the target database comprises initial driving parameter information of all display panels on the motherboard to which the display panel to be debugged belongs; and determining the first target driving parameter information of the display panel to be debugged according to the determination result and the position information.

2. The method of claim 1, wherein determining the first target driving parameter information of the display panel to be debugged according to the determination result and the position information comprises:

under a condition that the determination result is the target database exists, determining the initial driving parameter information in the target database matched with the location information as the first target driving parameter information of the display panel to be debugged.

3. The method of claim 2, wherein determining the initial driving parameter information in the target database matched with the location information as the first target driving parameter information of the display panel to be debugged comprises:

based on version information of the target database, determining the initial driving parameter information in the target database matched with the location information as the first target driving parameter information of the display panel to be debugged.

4. The method of claim 3, wherein determining the initial driving parameter information matched with the location information in the target database as the first target driving parameter information of the display panel to be debugged based on the version information of the target database comprises:

under a condition that the version information of the target database is the latest version information, determining the initial driving parameter information in the target database matched with the location information as the first target driving parameter information of the display panel to be debugged.

5. The method of claim 3, wherein determining the initial driving parameter information in the target database matched with the location information as the first target driving parameter information of the display panel to be debugged based on the version information of the target database comprises:

under a condition that the version information of the target database is not the latest version information, obtaining an updated target database by updating missing initial driving parameter information in the target database to the target initial driving parameter information, wherein the updated target database is the target database corresponding to the latest version information, and the target initial driving parameter information is the initial driving parameter information stored in a fixture; and determining the initial driving parameter information in the updated target database matched with the location information as the first target driving parameter information of the display panel to be debugged.

6. The method of claim 1, wherein determining the first target driving parameter information of the display panel to be debugged according to the determination result and the position information comprises:

under a condition that the determination result is the target database does not exist, establishing the target database;

determining the initial driving parameter information in the target database matched with the position information as the first target driving parameter information of the display panel to be debugged.

7. The method of claim 1, wherein after debugging the driving parameters of the display panel to be debugged according to the first target driving parameter information, the method further comprises:

determining second target driving parameter information which corresponds to driving parameter information when the driving parameters is successfully debugged; and updating the first target driving parameter information in a target database to the second target driving parameter information.

8. The method of claim 7, wherein after determining the second target driving parameter information, and before updating the first target driving parameter information in the target database to the second target driving parameter information, the method further comprises:

determining whether the display panel to be debugged is a display panel access to power supply first in a batch to which the display panel to be debugged belongs, and determining whether the display panel to be debugged is a display panel whose driving parameters are debugged first in the batch;

wherein updating the first target driving parameter information in the target database to the second target driving parameter information comprises:

under a condition that the display panel to be debugged is not the display panel access to power supply first in the batch and the display panel to be debugged is not the display panel whose driving parameters are debugged first in the batch, updating the first target driving parameter information in the target database to the second target driving parameter information.

9. The method of claim 8, wherein after determining whether the display panel to be debugged is the display panel access to power supply first in a batch to which the display panel to be debugged belongs and determining whether the display panel to be debugged is the display panel whose driving parameters are debugged first in the batch, the method further comprises:

under a condition that the display panel to be debugged is the display panel access to power supply first in the batch and the display panel to be debugged is the display panel whose driving parameters are debugged first in the batch, updating all the initial driving parameter information in the target database to the second target driving parameter information.

10. The method of claim 1, wherein determining the first target driving parameter information of the display panel to be debugged according to the position information comprises:
under a condition that the display panel to be debugged is not the display panel access to power supply first in the batch and the display panel to be debugged is not the display panel whose driving parameters are debugged first in the batch, determining the second target driving parameter information in the target database matched with the location information as the first target driving parameter information of the display panel to be debugged.

11. The method of claim 1, wherein the first target driving parameter information comprises at least one of a display luminance value, gamma data, lowest gray-scale voltage data, highest gray-scale voltage data, a high level, a low level, a first power supply voltage, and a second power supply voltage.

12. The method of claim 1, wherein obtaining the position information of the display panel to be debugged on the motherboard to which the display panel to be debugged belongs comprises:
according to identification information of the display panel to be debugged, determining the position information of the display panel to be debugged on the motherboard to which the display panel to be debugged belongs.

13. An electronic device comprising a processor and a memory for storing computer program instructions, which when executed by the processor, implement a method for debugging driving parameters of a display panel, the method comprising:
obtaining position information of the display panel to be debugged on a motherboard to which the display panel to be debugged belongs;
determining first target driving parameter information of the display panel to be debugged according to the position information; and
debugging the driving parameters of the display panel to be debugged according to the first target driving parameter information,
wherein after obtaining the position information of the display panel to be debugged on the motherboard to which the display panel to be debugged belongs, and before determining the first target driving parameter information of the display panel to be debugged according to the position information, the method further comprises:
determining whether the display panel to be debugged is a display panel access to power supply first in a batch to which the display panel to be debugged belongs, and determining whether the display panel to be debugged is a display panel whose driving parameters are debugged first in the batch;
wherein determining the first target driving parameter information of the display panel to be debugged according to the position information comprises:
under a condition that the display panel to be debugged is the display panel access to power supply first in the batch and the display panel to be debugged is the display panel whose driving parameters are debugged first in the batch, determining whether there exists a target database and obtaining a determination result, wherein the target database comprises initial driving parameter information of all display panels on the motherboard to which the display panel to be debugged belongs; and
determining the first target driving parameter information of the display panel to be debugged according to the determination result and the position information.

14. The electronic device of claim 13, wherein determining the first target driving parameter information of the display panel to be debugged according to the determination result and the position information comprises:
under a condition that the determination result is the target database exists, determining the initial driving parameter information in the target database matched with the location information as the first target driving parameter information of the display panel to be debugged.

15. The electronic device of claim 14, wherein determining the initial driving parameter information in the target database matched with the location information as the first target driving parameter information of the display panel to be debugged comprises:
based on version information of the target database, determining the initial driving parameter information in the target database matched with the location information as the first target driving parameter information of the display panel to be debugged.

16. The electronic device of claim 15, wherein determining the initial driving parameter information matched with the location information in the target database as the first target driving parameter information of the display panel to be debugged based on the version information of the target database comprises:
under a condition that the version information of the target database is the latest version information, determining the initial driving parameter information in the target database matched with the location information as the first target driving parameter information of the display panel to be debugged.

17. The method of claim 15, wherein determining the initial driving parameter information in the target database matched with the location information as the first target driving parameter information of the display panel to be debugged based on the version information of the target database comprises:
under a condition that the version information of the target database is not the latest version information, obtaining an updated target database by updating missing initial driving parameter information in the target database to the target initial driving parameter information, wherein the updated target database is the target database corresponding to the latest version information, and the target initial driving parameter information is the initial driving parameter information stored in a fixture; and
determining the initial driving parameter information in the updated target database matched with the location information as the first target driving parameter information of the display panel to be debugged.

18. The electronic device of claim 13, wherein obtaining the position information of the display panel to be debugged on the motherboard to which the display panel to be debugged belongs comprises:

according to identification information of the display panel to be debugged, determining the position information of the display panel to be debugged on the motherboard to which the display panel to be debugged belongs.

* * * * *